US 9,789,735 B2

(12) United States Patent
Schiavolin et al.

(10) Patent No.: US 9,789,735 B2
(45) Date of Patent: Oct. 17, 2017

(54) PAIR OF MOTOR VEHICLE TYRES (75) Inventors: Andrea Schiavolin, Milan (IT); Mario Mariani, Milan (IT); Pierangelo Misani, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1211 days.

(21) Appl. No.: 13/384,825

(22) PCT Filed: Jul. 28, 2010

(86) PCT No.: PCT/IB2010/001856
§ 371 (c)(1),
(2), (4) Date: Jan. 19, 2012

(87) PCT Pub. No.: WO2011/012980
PCT Pub. Date: Feb. 3, 2011

(65) Prior Publication Data
US 2012/0118456 A1    May 17, 2012

Related U.S. Application Data (60) Provisional application No. 61/272,755, filed on Oct. 29, 2009.

(30) Foreign Application Priority Data

Jul. 28, 2009   (IT) .............................. RM2009A0397

(51) Int. Cl.
*B60C 11/03* (2006.01)
*B60C 11/117* (2006.01)

(52) U.S. Cl.
CPC ........ *B60C 11/033* (2013.01); *B60C 11/0302* (2013.01); *B60C 11/032* (2013.01);
(Continued)

(58) Field of Classification Search
CPC ............... B60C 11/0302; B60C 11/033; B60C 2011/0374; B60C 11/032
See application file for complete search history.

(56) References Cited

U.S. PATENT DOCUMENTS 4,364,426 A * 12/1982 Mills ...................... B60C 11/01
152/209.11
D455,708 S * 4/2002 Yuze ........................... D12/535
(Continued)

FOREIGN PATENT DOCUMENTS

EP    0 906 836 A2    4/1999
EP    1 826 026 A1    8/2007
(Continued)

OTHER PUBLICATIONS

Machine translation for Japan 2007-331596 (no date).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

A pair of motor vehicle tires includes a front tire and a rear tire to be mounted respectively on a front wheel and a rear wheel of a two-wheeled vehicle, each tire of the pair having a tread band extending around an axis of rotation. The tread band of the front tire includes a central annular portion straddling an equatorial plane and two annular shoulder portions disposed on axially opposite sides of the central annular portion. The central annular portion includes at least a pair of first grooves extending substantially longitudinally on opposite sides of the equatorial plane in such a way as to form a concavity directed toward the equatorial plane. Each shoulder portion includes a plurality of second grooves isolated from the first grooves and extending substantially transversally so as to form an average inclination with the equatorial plane greater than 90°. The tread band of the rear (Continued)

tire includes instead a module which is replicated along a direction of circumferential development of the tire, the module including: at least one first pair of first grooves inclined in opposite directions with respect to the equatorial plane of the tire; each first groove of the first pair extending along a portion of the tread band between the equatorial plane and a respective shoulder and forming an average inclination less than 60° with the equatorial plane.

16 Claims, 3 Drawing Sheets

(52) U.S. Cl.
CPC .................. *B60C 2011/0374* (2013.01); *B60C 2011/0381* (2013.01); *B60C 2011/0388* (2013.01); *B60C 2200/10* (2013.01)

(56) References Cited

U.S. PATENT DOCUMENTS

| | | | |
|---|---|---|---|
| D541,732 S * | 5/2007 | Steinbach | D12/535 |
| D561,684 S * | 2/2008 | Gallo | D12/535 |
| D587,645 S * | 3/2009 | Steinbach | D12/535 |
| D599,729 S * | 9/2009 | Kumamoto | D12/535 |
| D612,796 S * | 3/2010 | Kajimoto | D12/535 |
| 2005/0098250 A1* | 5/2005 | Ito | B60C 11/0302 152/209.11 |
| 2006/0219342 A1* | 10/2006 | Steinbach | B60C 11/0302 152/209.11 |
| 2009/0308515 A1* | 12/2009 | Matsunaga | B60C 11/0302 152/209.18 |
| 2010/0126645 A1 | 5/2010 | Barboza et al. | |
| 2010/0193095 A1* | 8/2010 | Nakagawa | B60C 11/033 152/209.5 |
| 2010/0282390 A1* | 11/2010 | Mariani | B60C 11/0302 152/454 |

FOREIGN PATENT DOCUMENTS

| | | | |
|---|---|---|---|
| EP | 2 135 752 A1 | | 12/2009 |
| JP | 63-121505 A | * | 5/1988 |
| JP | 05-201207 A | * | 8/1993 |
| JP | 07-228107 A | * | 8/1995 |
| JP | 08-188016 A | * | 7/1996 |
| JP | 63-116907 A | * | 5/1998 |
| JP | 11-208218 A | * | 8/1999 |
| JP | 2007-331596 A | * | 12/2007 |
| WO | WO 2008/124899 A1 | | 10/2008 |
| WO | WO-2009/013961 A1 | * | 1/2009 |
| WO | WO 2009/013961 A1 | | 1/2009 |
| WO | WO 2009/060481 A1 | | 5/2009 |
| WO | WO-2009/060481 A1 | * | 5/2009 |
| WO | WO 2011/012977 A1 | | 2/2011 |
| WO | WO 2011/012979 A1 | | 2/2011 |

OTHER PUBLICATIONS

Machine translation for Japan 11-208218 (no date).*
Machine translation for Japan 08-188016 (no date).*
Machine translation for Japan 07-228107 (no date).*
Machine translation for Japan 05-201207 (no date).*
Translation for Japan 63-116907 (no date).*
Machine translation for Japan 63-121505 (no date).*
International Search Report from the European Patent Office for International Application No. PCT/IB2010/0021856, mailed Nov. 24, 2010.

* cited by examiner

PAIR OF MOTOR VEHICLE TYRES

CROSS REFERENCE TO RELATED APPLICATIONS

This application is a national phase application based on PCT/IB2010/001856, filed Jul. 28, 2010, which claims priority of Italian Patent Application No. RM2009A000397, filed Jul. 28, 2009, and the benefit of U.S. Provisional Application No. 61/272,755, filed Oct. 29, 2009, the content of all of which is incorporated herein by reference.

BACKGROUND OF THE INVENTION

Field of the Invention

The present invention relates to motor vehicle tyres. In particular, the present invention relates to a pair of tyres intended to be respectively mounted on the front and rear wheels of "supersport" motor vehicles having large engine capacity (e.g. 600 cm$^3$ or higher), and/or high power (e.g. 170-180 hp or higher), also used on tracks.

Description of the Related Art

In recent times a trend has been observed to introduce in the market motor vehicles for supersport use having increasingly high power. For example, motor vehicles for road use having an engine capacity of 1000 cm$^3$, with powers of 180 hp, are in fact already available on the market.

For ensuring such high performances, the tyres mounted on the wheels of such motor vehicles shall have very good features as regards the grip to the ground, so as to be able to effectively transfer the high traction torque to the ground, both while running on a straight path and while accelerating on leaving a bend, as well as to ensure an effective braking action. The grip becomes a really critical issue above all when running on wet road surfaces.

For ensuring to the motorcyclist that such performances are reached in a fully safe condition, the tyres shall ensure, together with a very good grip to the ground, behaviour stability both while running on a straight path and while running on bends, particularly in conditions of high acceleration/deceleration. In fact, a stable behaviour of the tyre indicates its capacity to effectively dampen perturbations transmitted by the unevenness of the road surface while running, so that such perturbations are not propagated to the motor vehicle, thus compromising the driving stability.

Among the features that the tyres shall ensure, the water draining is particularly important in the specific case of tyres for front wheels. An effective water draining of the front tyre allows the rear tyre to run on a straight path on drained asphalt, so as to effectively transfer the power to the ground.

In the specific case of tyres for rear wheels are instead particularly important, besides the grip to the ground and draining, the behaviour stability and the wear evenness.

Generally, in order to meet at least some of the aforementioned needs, a plurality of grooves is formed on the tread band, which grooves substantially extend from the central annular portion of the tread band up to the opposite shoulder annular portions.

The behaviour of the tyre while running is in fact greatly influenced by the number, orientation, arrangement and shape of such grooves, i.e. by the specific pattern of the tread band.

EP1826026 describes a tyre for a two-wheeled vehicles comprising a tread band provided with a pair of circumferential grooves extending substantially in a circumferential direction of the tyre and oppositely disposed to the equatorial plane (CL) of the tyre, and a plurality of inclined grooves extending from an outer side to an inner side in a width direction on a grounding surface of a tread band portion to be inclined with respect to a circumferential direction of the tyre and ended within the grounding surface of the tread band. The inclined grooves slant in mutually opposite directions with respect to the circumferential direction and are alternatively arranged along the circumferential direction of the tyre. At least some of the inclined grooves extend across the equatorial plane of the tyre.

EP906836 describes a tyre for a two-wheeled vehicle comprising a tread band having at least one groove extending axially from the tread centre to the tread edges. In a first axial region of the tread band, which is the central region of the tread band and is intended to contact the ground when moving in a straight line, the groove is arranged substantially circumferentially. In a second axial region at the axial edge of tread band, which is the region intended to contact the ground when the vehicle is cornering at the maximum camber angle, the alignment of the grooves is substantially transverse. In a third axial region, which is the region of the tread band between the first central region and the second region, and which is the region intended to contact the ground when the vehicle is cornering at a camber angle less than the maximum one, the alignment changes progressively axially outwardly from substantially circumferential to substantially transverse so that in the first, second and third axial regions of the tread band the grooves are substantially aligned with the resultant forces acting on the tread band surface in the contact region between the tread band and the ground.

SUMMARY OF THE INVENTION

The Applicant has however noted that in tyres for two-wheeled vehicles such as those described in the documents above, the void to rubber ratio may be too high and thus unsuitable for tyres for the sport segment.

The Applicant has thus faced the problem of providing pair of motor vehicle tyres for the sport segment characterised by a tread band with a very low number of grooves, which are nevertheless able to ensure suitable performances and behaviour stability features when used on wet grounds.

The Applicant has found that in tyres for the sport segment it is possible to obtain an effective water draining action without reducing the performances, by providing a pair of tyres wherein in the front tyre the grooves define on the tread band two distinct regions characterized by a different groove extension and inclination, and in the rear tyre the grooves define on the tread band a single region characterised by a same groove course and extension, and wherein both of the tyres of the pair have a sub-portion straddling the equatorial plane substantially without grooves.

In the front tyre the central region straddling the equatorial plane is provided with a plurality of substantially longitudinal grooves having a predetermined extension and the two shoulder portions are provided only with inclined grooves having a limited extension.

The rear tyre is instead provided only with grooves inclined in opposite directions with respect to the equatorial plane and having a considerable extension.

In a first aspect thereof, the invention relates to a pair of motor vehicle tyres, comprising a front tyre and a rear tyre to be mounted respectively on a front wheel and a rear wheel of a two-wheeled vehicle, each tyre of the pair having a tread band extending around an axis of rotation Z and having a tread pattern such as to define overall a void to rubber ratio less than 10%, and locally, in an annular central sub-portion straddling a respective equatorial plane X-X of each tyre of the pair, a void to rubber ratio substantially equal to zero; wherein:

the tread pattern of the tread band of the front tyre comprises a central annular portion A straddling an equatorial plane X-X and two annular shoulder portions B disposed on axially opposite sides of the central annular portion A;

the central annular portion A has an axial dimension less than 50% of the lateral development of the tread band, and comprises at least a pair of first grooves extending substantially longitudinally on opposite sides of the equatorial plane X-X in such a way as to form a concavity directed towards the equatorial plane X-X;

each shoulder portion B has an axial dimension that is less than 35% of the lateral development of the tread band and comprises a plurality of second grooves isolated from the first grooves and extending substantially transversally so as to form an average inclination with the equatorial plane X-X greater than 90°;

the tread pattern of the tread band of the rear tyre comprises a module which is replicated along a direction of circumferential development of the tyre, said module comprising at least one first pair of first grooves inclined in opposite directions with respect to the equatorial plane X-X of the tyre; each first groove of the first pair extending along a portion of tread band comprised between the equatorial plane X-X and a respective shoulder whose axial extension is at least 30% of the tread band lateral development, and forming an average inclination less than 60° with the equatorial plane X-X.

The front tyre of the pair appears clearly divided into two regions: the central region with substantially longitudinal grooves and the shoulder region wherein the groove are instead substantially transverse.

The grooves of the central portion do not extend into the shoulder portions and similarly the grooves of the shoulder portions do not extend into the central portion.

The grooves thus define on the tread band two distinct "regions" (centre and shoulder) which can be easily distinguished by simply looking at the arrangement and extension of the grooves, which are therefore grouped into two distinct and separate groups.

Differently, in the rear tyre the grooves are not grouped in distinct or distinguishable regions of the tread band, so that the latter appears as a single "region" on which the grooves are arranged with a substantially transverse inclination.

Notwithstanding the low void to rubber ratio of the pair of tyres and the presence, at the equatorial plane, of a central sub-portion with void to rubber ration substantially equal to zero, the Applicant has found that such a combination allows achieving a high draining effectiveness when running on wet grounds, so that it is possible to maintain a considerable grip to the ground and to transfer the power to the ground also in such conditions. Moreover, the pair of tyres has a very good behaviour when running on dry grounds: the Applicant believes that such a result is at least partially due to the presence of the central sub-portion with a void to rubber ratio substantially equal to zero, which advantageously defines a ring with high structural stiffness at the equatorial plane of the tyre.

For the purposes of the present invention, by the expression module of a tread pattern it is meant the minimum portion of the tread pattern which is repeated the same in succession along the whole circumferential development of the tread band itself. The modules, while keeping the same pattern configuration, may however have different circumferential lengths.

Furthermore, for the purposes of the present invention, by "tread pattern" it is meant the representation of each point of the tread band (grooves included) on a plane perpendicular to the equatorial plane of the tyre and tangent to the maximum diameter of the tyre. In the representation:

in the lateral direction the distance of each point of the tread band from the equatorial plane corresponds to the distance of such point from the equatorial plane measured on the lateral development of the band itself;

in the circumferential direction the distance between any two points of the tread band corresponds to the distance between the projections of the two points on the circumference corresponding to the maximum diameter of the tyre, which projection is obtained by means of radial planes passing at the two points.

Angular measurements, and/or linear quantities (distances, widths, lengths, etc.), and/or surfaces are to be intended as referred to the tread patter as defined above.

Furthermore, referring to the angular arrangement of the grooves formed in the tread band with respect to the equatorial plane of the tyre, such angular arrangement is to be intended, for each point of the groove, as referred to the angle (comprised between 0° and 180°), taken as absolute value, defined by a rotation performed starting from the equatorial plane and reaching the direction tangent to the groove passing at that point. Both for the front and rear tyres, the rotation is to be intended as performed by a vector initially having the direction defined, in the tread pattern, by the equatorial plane, and oriented opposite to the predetermined rotation direction of the tyre.

For the purposes of the present invention, the following definitions are further applied:

By "motor vehicle tyre" it is meant a tyre having a high curvature ratio (typically higher than 0.200), which allows high camber angles (for example 50°-60°) to be reached when the motor vehicle runs on a bend.

By "equatorial plane" of the tyre it is meant a plane perpendicular to the rotation axis of the tyre and dividing the tyre into two symmetrically equal portions.

By "circumferential" direction it is meant a direction generically directed according to the rotation direction of the tyre, or in any case only slightly inclined with respect to the rotation direction of the tyre.

By "void to rubber ratio" it is meant the ratio between the total surface of the notches of a determined portion of the tread pattern of the tyre (possibly of the whole tread pattern) and the total surface of the determined portion of the tread pattern (possibly of the whole tread pattern).

By "lateral development" of the tread band it is meant the length of the arc defining the radially outermost profile of the tread band in a cross section of the tyre.

By "axial extension" of a tread band portion it is meant the extension of such portion on the lateral development of the tread band.

By "curvature ratio" of the tyre it is meant the ratio between the distance of the radially highest point of the tread band from the maximum chord of the tyre, and the same maximum chord of the tyre, in a cross section of the tyre.

By "circumferential extension" of a groove it is meant the extension in the circumferential direction of the groove itself.

If not differently stated, by "extension" of a groove it is meant the length of the groove measured along its extension.

By "average inclination" of a groove it is meant the arithmetical mean of the inclinations of the segments forming the groove.

By pitch of the tyre it is meant the length in the circumferential extension of a module.

By "isolated grooves" it is meant that the grooves considered do not have portions in contact with each other, in other words they are not joined with each other by grooves, notches or sipes and/or portions thereof.

The present invention, in one or more preferred aspects, may comprise one or more of the features hereinafter presented.

For avoiding an excessive reduction in the number of grooves of the tread pattern, with a resulting safety reduction when running on wet grounds, the tread pattern may conveniently define on the tread band of the front tyre and/or of the rear tyre a void to rubber ratio of more than 4%.

Conveniently, the tread pattern of the front and rear tyres defines at least one axially outer portion on each tread band with a void to rubber ratio substantially equal to zero.

The Applicant has observed that such choice allows a considerable improvement in the contact surface when running on a bend on dry grounds at the maximum camber angle (or in any case at very high camber angles), which results in higher roadholding, stability and acceleration power when the motor vehicle is leaving the bend. Furthermore, the Applicant has observed that such a choice does represent a danger when running on wet grounds, since such running conditions do not allow high camber angles on a bend to be reached.

Preferably, the module of the tread band of the rear tyre comprises at least one second pair of second grooves inclined in opposite directions with respect to the equatorial plane X-X.

Each second groove of the second pair extends on tread band portion between the equatorial plane (X-X) and a respective shoulder having an axial extension equal to at least 30%, preferably equal to at least 35%, of the lateral development of the tread band.

Conveniently, in the rear tyre the first grooves of each first pair of first grooves are mutually staggered in the circumferential direction in such a way as to maintain a substantially constant distance of less than of the pitch.

Preferably, also the second grooves of each second pair of second grooves are mutually staggered in the circumferential direction in such a way as to maintain an substantially constant distance of less than of the pitch.

In order to evaluate the distance in the circumferential direction between the grooves, it can be measured, for example, the distance in the circumferential direction between the axially innermost ends of the grooves themselves.

The Applicant believes that by forming on the tread band of the rear tyre a groove extending from the equatorial plane towards a respective shoulder at a reduced and substantially constant circumferential distance from a groove extending with an opposite inclination from the equatorial plane towards the remaining shoulder, and by repeating such an arrangement along the circumferential development of the tyre, a good draining action can be obtained by means of the aforementioned grooves at the central annular portion of the tread band without weakening the structure and affecting the tyre grip.

Preferably, in the rear tyre the first grooves of each first pair of first grooves are mutually staggered in the circumferential direction in such a way as to maintain a substantially constant distance of about ¼ of the pitch.

Similarly, in the rear tyre the second grooves of each second pair of second grooves may be mutually staggered in the circumferential direction in such a way as to maintain a substantially constant distance of about ¼ of the pitch.

In the rear tyre the first grooves may have an axially inner end which is at a predetermined distance $D_1$ from the equatorial plane X-X.

Similarly, the second grooves may have an axially inner end which is at a predetermined distance $D_2$ from the equatorial plane X-X.

Preferably, $D_1$ is different from $D_2$.

Advantageously, still in the rear tyre the first grooves may comprise, moving axially away from the equatorial plane X-X of the tyre, a plurality of segments. In a preferred embodiment the first grooves respectively comprise at least a first, a second and a third segment, all substantially straight. The first, second and third segments of the first grooves may have different inclinations with respect to the equatorial plane X-X of the tyre.

Preferably, the first segment may be inclined by an angle $\alpha_1$ with respect to the equatorial plane X-X, the second segment may be inclined with respect to the equatorial plane X-X by an angle $\alpha_2$ greater than $\alpha_1$, and the third segment may be inclined with respect to the equatorial plane X-X by an angle $\alpha_3$ less than $\alpha_2$.

Advantageously, the first segment of each first groove is inclined with respect to equatorial plane X-X by an angle $\alpha_1$ less than 45°.

Conveniently, the choice of an almost circumferential inclination for the first segment of the first grooves allows reducing the impact frequency of the groove ends on the ground while the tyre is rolling at high speed on a straight path or on bends with a large bending radius, which results in an improvement as regards the behaviour stability of the tyre and in a better wear resistance.

Preferably, in the rear tyre the second grooves comprise, moving axially away from the equatorial plane X-X of the tyre, a plurality of segments. In a preferred embodiment, the second grooves comprise two substantially straight segments. The first, axially innermost, segment preferably has an extension that is less than the second segment.

Conveniently, in the rear tyre the first segment of the second grooves may be inclined with respect to the equatorial plane X-X by an angle $\alpha_4$ and the second segment of the second grooves may be inclined with respect to the equatorial plane X-X by an angle $\alpha_5$ greater than $\alpha_4$.

Preferably, in the rear tyre the first segment of the second grooves has an extension that is less than 50% of the extension of the second segment.

Conveniently, in the rear tyre the first segment of the second grooves may be inclined with respect to equatorial plane X-X by an angle $\alpha_4$ less than 45°.

Also in this case, the choice of an almost circumferential inclination for the first segment of the second grooves allows reducing the impact frequency of the groove ends on the ground while the tyre is rolling at high speed on a straight path or on bends with a large bending radius, which results in an improvement as regards the behaviour stability of the tyre and in a better wear resistance.

Preferably, in the rear tyre, the second segment of the second grooves is inclined with respect to the equatorial plane X-X by an angle $\alpha_5$ greater than $\alpha_4$.

Conveniently, in the front tyre the first grooves, i.e. the grooves arranged within the central annular portion A of the tread band, may have a circumferential extension that is less than 6% of the overall circumferential development of the tyre. Conveniently, subsequent pairs of first grooves are mutually staggered in the circumferential direction.

In a preferred embodiment, the first grooves of each pair comprise at least one first segment and at least one second segment that is inclined with respect to the first segment.

Preferably, the first segment of the first grooves may have an extension that is less than the second segment and precedes the second segment in the tyre rolling direction.

The "precedence" of the first groove segment with respect to the second groove segment "in the tyre rolling direction" is to be referred to the entrance in the footprint area. It is meant, therefore, that while the tyre mounted on the front tyre of a motor vehicle is rolling for making the motor vehicle to move forward, the first segment, of the two forming the groove, is the first to contact the ground.

Preferably, in the front tyre the first segment of the first grooves may have an inclination of less than 45° to the equatorial plane X-X and the second segment of the first grooves may have an inclination of more than 90° to the equatorial plane X-X.

Preferably, in the front tyre the second grooves, i.e. the grooves arranged within the shoulder portions B, may have a first, axially innermost, segment and a second, axially outermost, segment. The second segment may have an extension that is less than the first segment.

The first and second segments of the second grooves may have different inclinations with respect to the equatorial plane. In particular, the first segment of the second grooves may have an inclination angle with respect to the equatorial plane which is less than that of the second segment.

Conveniently, in the front tyre, the shoulder portion B further has a plurality of substantially transverse third grooves.

Preferably, in the front tyre the third grooves alternate in the circumferential direction with the second grooves.

Conveniently, the third grooves may have a first, axially innermost, segment, and a second, axially outermost, segment. The first and second segment of the third grooves may have different inclinations with respect to the equatorial plane. In particular, the first segment of the third grooves may have an inclination angle with respect to the equatorial plane which is greater than that of the second segment.

Preferably, in the front tyre the first and second segments of the third grooves have an inclination that is less than 150°.

BRIEF DESCRIPTION OF THE FIGURES

Further features and advantages of the present invention shall become clearer from the following detailed description of some embodiments thereof, made hereafter for indicating and non limiting purposes with reference to the accompanying drawings, wherein.

DETAILED DESCRIPTION OF EMBODIMENTS OF THE INVENTION

Figure 1:
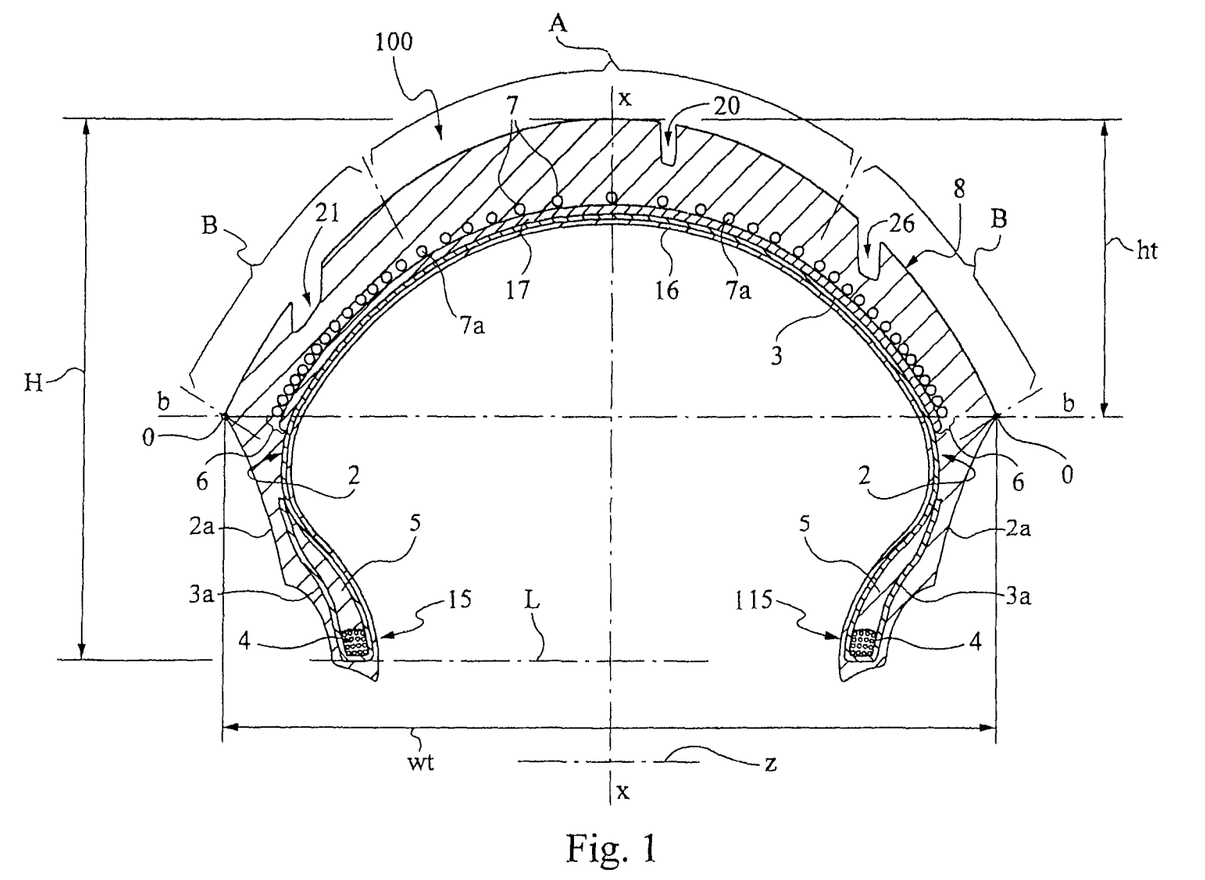
FIG. 1 schematically shows a section perpendicular to the equatorial plane of a motor vehicle tyre.
Figure 2:
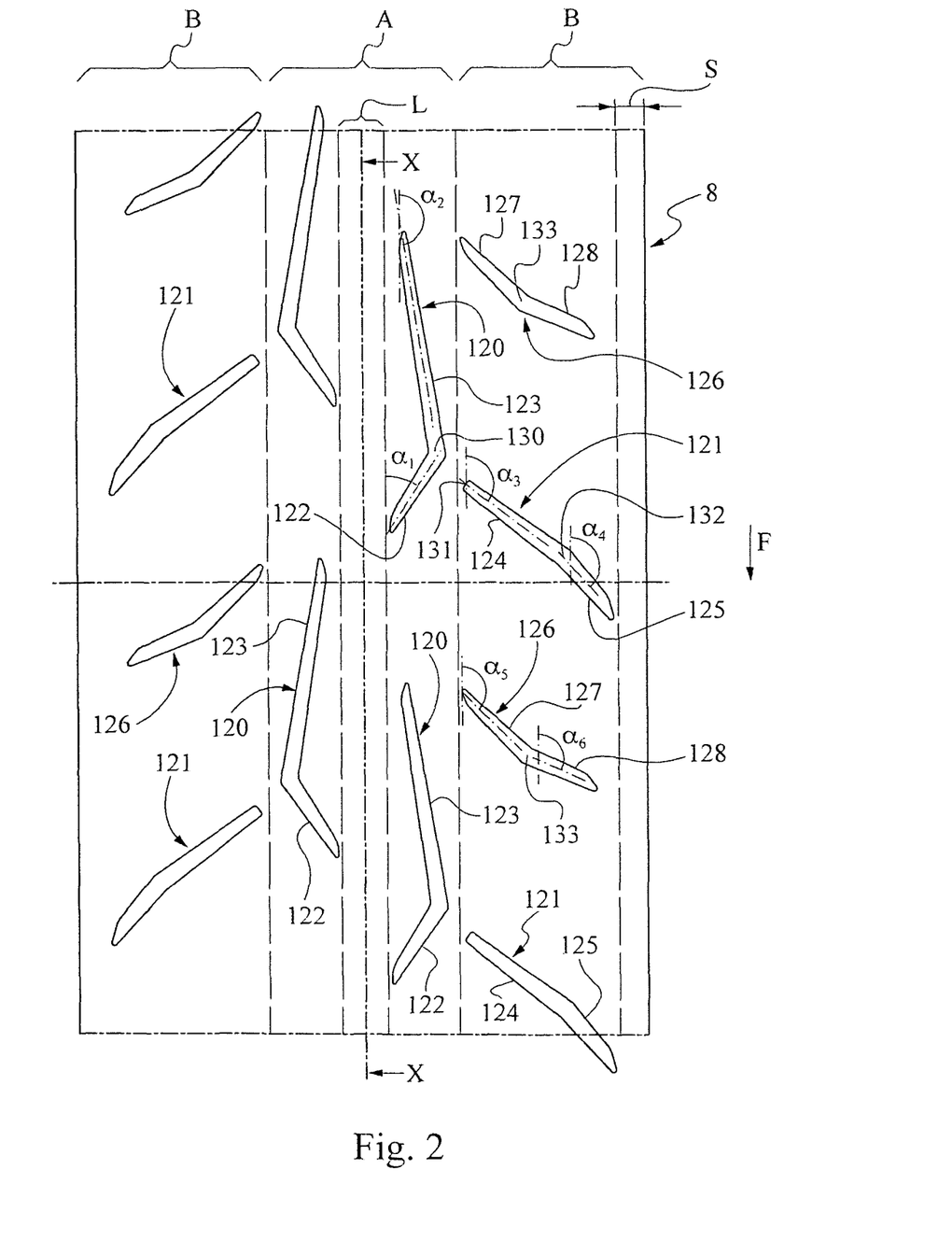
FIG. 2 shows a portion of the circumferential development of a first example of a tread pattern to be applied to a tyre according to the invention, particularly a tyre to be mounted on the front wheel of a motor vehicle.

In FIG. 1 and FIG. 2, a tyre for motor vehicle wheels of the pair according to the present invention is globally indicated at 100. In particular, this is a tyre preferably intended to be used on the front wheel of a motor vehicle for the sport or supersport segment.

An equatorial plane X-X and a rotation axis Z are defined in the tyre 100. Moreover, there are defined a circumferential direction (indicated in FIG. 2 by means of an arrow F pointing in the rotation direction of the tyre) and an axial direction perpendicular to the equatorial plane X-X.

The tyre 100 comprises a carcass structure 2 including at least one carcass ply 3.

The carcass structure 2 is preferably lined on its inner walls with a sealing layer 16, also called "liner", essentially consisting of a layer of an airproof elastomeric material, adapted to ensure the tight seal of the tyre itself after it has been inflated.

The carcass plies 3 are engaged, at the respective axially opposite lateral edges 3a, with respective annular reinforcing structures 4 intended to hold the tyre on a corresponding fitting rim. The annular reinforcing structures 4 are typically called "bead rings".

A tapered elastomeric filling 5 taking up the space defined between the carcass plies 3 and the respective turned up lateral edge 3a of the carcass plies 3 is applied onto the radially outer perimeter edge of the bead rings 4.

In an alternative embodiment, not shown, the carcass ply has its opposite lateral edges associated without a turn-up with special annular reinforcing structures provided with two metal annular inserts. In this case, a filling of elastomeric material can be arranged in an axially outer position with respect to the first annular insert. The second annular insert is instead arranged in an axially outer position with respect to the end of the carcass ply. Finally, in a axially outer position with respect to said second annular insert, and not necessarily in contact with the same, a further filling can be provided which finishes the formation of the annular reinforcing structure.

The region of the tyre comprising the bead ring 4 and the filling 5 defines the so-called "bead", globally indicated at 115 in FIG. 1, which is intended for anchoring the tyre to a corresponding fitting rim, not shown.

A belt structure 6 is provided in a radially outer position with respect to the aforementioned carcass structure.

A tread band 8, at which the tyre 1 contacts the ground, is provided in a radially outer position with respect to the belt structure 6.

The tyre may further comprise a pair of sidewalls 2a laterally applied to the carcass structure 2 on axially opposite sides of the equatorial plane X-X. The sidewalls extend from the tread band 8 to the bead 115 of the tyre.

The tyre 100 of the present invention is characterised by a high transverse curvature and lowered sidewalls.

The transverse curvature of a tyre is defined by the particular value of the ratio between the distance ht (FIG. 1) of the top of the tread band from the line b-b passing through the ends O of the tread, measured on the equatorial plane X-X, and the distance wt between said ends of the tread band. Should the ends of the tread band not be easily identifiable, for example due to the lack of a precise reference, such as for example the edge indicated at O in FIG. 1, as the distance wt can certainly be taken the length of the maximum chord of the tyre.

The value of the aforementioned transversal curvature is called "curvature ratio" of the tyre.

The tyre 100 of the present invention preferably has a curvature ratio greater than or equal to 0.2, preferably greater than or equal to 0.28, for example equal to 0.40. Such a curvature ratio is typically less than or equal to 0.8, preferably less than or equal to 0.5.

As regards the sidewalls, on the other hand, the tyre of the present invention is preferably a tyre with particularly low sidewalls (FIG. 1). By tyres with low or lowered sidewalls in the present description are meant tyres wherein the ratio between the distance (H-ht) and the height H, measured on the equatorial plane X-X between the top of the tread band and the fitting diameter, defined by the reference line 1 passing through the beads of the tyre, is less than 0.7, more preferably less than 0.5, for example equal to 0.38.

Each carcass ply 3 is preferably made from an elastomeric material and comprises a plurality of reinforcing elements (not shown) arranged parallel to one another.

The reinforcing elements included in the carcass plies 3 preferably comprise textile cords selected from those usually adopted in the manufacture of carcasses for tyres, for example nylon, rayon, aramid, PET, PEN, with an elementary thread having a diameter between 0.35 mm and 1.5 mm. The reinforcing elements in the carcass ply 3 are preferably arranged in a radial direction, i.e. according to an angle between 70° and 110°, more preferably between 80° and 100°, with respect to the equatorial plane X-X.

The belt structure 6 preferably comprises one or more rubberized cords 7, arranged parallel to one another and in side-by-side relationship in the axial direction on the crown portion 16 of the carcass structure 2, so as to form a plurality of coils 7a. Such coils are substantially oriented according to the circumferential direction of the tyre (typically with an angle between 0° and 5° with respect to the equatorial plane X-X of the tyre), such a direction usually being known as "at zero degrees" with reference to how it lies with respect to the equatorial plane X-X of the tyre. The aforementioned coils preferably extend over the entire crown portion of the carcass structure 2.

Preferably, the belt structure 6 consists of a single cord 7, or of a rubberized fabric strip comprising cords arranged in side-by-side relationship, preferably up to five, spirally wound from one end to the other on the crown portion 16 of the carcass structure 2.

Alternatively, the belt structure 6 may comprise at least two radially superimposed layers, each consisting of elastomeric material reinforced with cords arranged parallel to one another. The layers are arranged so that the cords of the first belt layer are oriented obliquely with respect to the equatorial plane of the tyre, whereas the cords of the second layer also have an oblique orientation, but symmetrically crossed with respect to the cords of the first layer, to form the so-called "cross-belt".

The cords 7 of the belt structure 6 are textile or metal cords.

Preferably, for the use in a belt at zero degrees, such cords are made through steel wires with high carbon content, i.e. steel wires with a carbon content at least equal to 0.7%. Preferably, such cords 7 are metal cords made from steel of the high elongation (HE) type. The high elongation (HE) cords have a load-elongation diagram comprising a curvilinear portion arranged between two substantially straight portions having different inclinations with respect to the axes of the diagram.

When textile cords are used, these can be made from a synthetic fiber, for example nylon, rayon, PEN, PET, preferably a synthetic fiber with high modulus, in particular synthetic aramid fiber (for example Kevlar® fibers). Alternatively, hybrid cords can be used comprising at least one thread with low modulus, i.e. with a modulus not greater than 15000 N/mm² (for example nylon or rayon), interwoven with at least one thread with high modulus (for example Kevlar®), i.e. with a modulus not smaller than 25000 N/mm².

The belt structure 6 may also comprise a first support layer 17 substantially consisting of a sheet of elastomeric material interposed between the layer of cords 7 and the carcass ply 3 and on which the coils 7a are wound. Such layer may extend on a surface having an axial extension substantially corresponding to the surface on which the coils 7a extend.

In a preferred embodiment of the tyre 100 of the present invention, the layer 17 comprises short aramid fibres, for example made from Kevlar®, dispersed in the elastomeric material.

In the pair of tyres according to the present invention, the front tyre has a central portion straddling the equatorial plane provided with a plurality of substantially longitudinal grooves having a limited extension and two shoulder portions provided with grooves inclined in a substantially transverse direction and having a limited extension, whereas the rear tyre is provided only with grooves inclined in opposite directions with respect to the equatorial plane and having a significant extension.

Both the tyres of the pair have a sub-portion straddling the equatorial plane substantially without grooves.

A tread band portion may be considered substantially without grooves when it has a very low void to rubber ratio, for example less than 4%, preferably less than 3%, even more preferably less than 1-2%.

FIG. 2 shows an example of a tread pattern which can be used in a front tyre. A tread pattern as in the example shown in FIG. 2 globally defines on the tread band 8 a void to rubber ratio of less than 10%. Preferably, such void to rubber ratio is less than 9%.

For avoiding an excessive reduction in the number of grooves of the tread pattern, with a resulting safety reduction when running on wet grounds, the tread pattern conveniently defines on the tread band a void to rubber ratio of more than 4%. In the example shown in FIG. 2, the void to rubber ratio is equal to about 7%.

As better shown in FIG. 2, a central annular portion A straddling the equatorial plane X-X and two axially outer annular shoulder portions B, arranged on axially opposite sides of the central annular portion A, can be identified in the tread band 8.

The central annular portion A is intended to contact the road surface when the motor vehicle runs on a straight path or with a slight lean, whereas the shoulder portions B are mainly intended to contact the road surface when the motor vehicle runs on a bend with a more marked lean.

Preferably, the central annular portion A has an axial extension at most equal to 50% of the lateral development of the tread band 8. The central annular portion A has a plurality of pairs of first grooves 120. Preferably, in such portion the void to rubber ratio is between 0.15 and 0.25.

In each pair, the grooves 120 are arranged on opposite sides of the equatorial plane X-X so as to define a central annular sub-portion L straddling the equatorial plane X-X with a void to rubber ratio substantially equal to zero.

The central annular sub-portion L has an axial extension equal to at least 5% of the lateral development of the tread band 8, at most equal to 15%, for example equal to 10% of the lateral development of the tread band 8.

This choice can be particularly advantageous for the front tyre, since it allows the area of the contact region between tyre and ground when running on a straight path at high speed to be considerably increased, so as to effectively transfer to the ground the traction torque while accelerating and/or the braking torque while decelerating. Moreover, the formation of a closed tread band ring in the central sub-portion L advantageously increases the stiffness thereof.

The first grooves 120 of each pair are preferably staggered in the circumferential direction.

Preferably, the first grooves 120 of each pair are staggered in the circumferential direction at most by ½ of the pitch, preferably by ¼ of the pitch.

Each groove 120 has a circumferential extension less than 6% of the circumferential development.

In other words, in the central annular portion A of the tyre according to the invention, the formation of grooves (with a straight or a zig-zagging arrangement) arranged on the whole circumferential extension of the tread is avoided. This choice allows an increase of the tyre grip when running on a straight path, particularly while braking. The Applicant has further observed a very good running stability on a straight path when a front tyre having first grooves spaced apart from each other is used.

Preferably, each groove 120 has a circumferential extension of more than 3% of the circumferential development.

Each groove 120 has a first segment 122 and a second segment 123 inclined with respect to the first segment 122 so as to form a concavity directed towards the equatorial plane X-X.

According to an important aspect of the present invention the first segment 122 of the grooves 120 is shorter than the second segment 123 and precedes the second segment in the circumferential direction according to the tyre rolling direction indicated by the arrow F in FIG. 2.

The "precedence" of the first groove segment with respect to the second groove segment "in the tyre rolling direction" is to be referred to the entrance in the footprint area. It is meant, therefore, that while the tyre mounted on a front tyre of a motor vehicle is rolling for making the motor vehicle to move forward, the first segment, of the two forming the groove, is the first to contact the ground.

The first segment 122 has a circumferential extension shorter than the second segment 123 and is inclined by an angle $\alpha_1$ with respect to the equatorial plane X-X.

Preferably $\alpha_1$ is less than 45°, more preferably less than 40°, for example equal to about 35°.

Conveniently, the choice of a small angle for the first segment 122 allows the impact frequency of the notch ends on the ground while the tyre is rolling at high speed on a straight path to be reduced, which results in an improvement as regards the behaviour stability of the tyre and in a better wear resistance.

The second segment 123 has a circumferential extension greater than the first segment 122. Preferably, the extension of the second segment 123 is equal to at least 1.5 times the circumferential extension of the first segment 122. The second segment 123 has an opposite inclination with respect to that of the first segment 122. In other words, the second segment 123 of the first groove 120 defines an angle $\alpha_2$ of more than 90° with the equatorial plane X-X. In preferred embodiments, the angle $\alpha_2$ is more than 160°.

In the Applicant's view, the different extension of the first segment 122 and of the second segment 123, preferably together with their opposite inclination, allows a very good water draining when running on a straight path on wet grounds to be obtained. In particular, the first segments 122, which are longer, allow the water to be effectively drained while accelerating, whereas the second segments 123, which are shorter, are more active in the baking phases. Furthermore, it has been observed a very good wear evenness in the central annular portion A while running on dry grounds.

Preferably, the grooves 120 do not have a constant width along their extension, having instead a variable width.

In detail, the first segment 122 has a width increasing from its free end towards the intersection area 130 with the second segment 123.

In detail, the first segment 122 may have a width greater than or equal to about 3 mm at its free end.

In a similar way, the second segment 123 has width increasing from its free end towards the intersection area 130 with the first segment 122.

In detail, the second segment 123 may have a width greater than or equal to about 3 mm at its free end.

In the embodiment shown in FIG. 2 the first grooves 120 have a depth which decreases diminishing from the equatorial plane X-X towards the shoulders. Preferably, the first grooves 120 have a depth less than or equal to 6 mm, more preferably less than 5 mm.

The aforementioned choices as to the depth and width of the first grooves 120 contribute at obtaining a good behaviour of the tread band 8 on wet road surfaces.

Still referring to FIG. 2, each shoulder annular portion B has an axial extension less than or equal to 40% of the axial extension of the tread band 8.

Each shoulder annular portion B has a plurality of second grooves 121 extending substantially transversally on the tread band 8.

Also the second grooves 121 preferably have a first segment 124 and a second segment 125, the latter having an axial extension shorter than the first segment 124. The first segment 124 has an axially inner position with respect to the second segment 125.

The second grooves 121 are arranged axially in side-by-side relationship with the first grooves 120 and have an average inclination between 90° and 140°.

The first segment 124 of the second grooves 121 is inclined with respect to the equatorial plane X-X by an angle $\alpha_3$ preferably of more than 120°, for example equal to about 130°.

The second segment 125 of the second grooves 121 is inclined by an angle $\alpha_4$ greater than $\alpha_3$.

The second segment 125 of the second grooves 121 is inclined with respect to the equatorial plane X-X by an angle $\alpha_4$ preferably of more than 130°, for example equal to about 140°.

Preferably the second grooves 121 are arranged so that their axially innermost free end 131 points towards the intersection area 130 of the first 122 and second 123 segments of the first grooves 120.

Advantageously, the first grooves 120 and the second grooves 121 remain separated from one another. Preferably, the separation area between the first grooves 120 and the second grooves 121 may be at least equal to the width of the grooves themselves. In a preferred embodiment, such separation area has a width (measured in the axial direction) equal to at last 6 mm. In the Applicant's view, keeping a separation area between the first grooves 120 and the second grooves 121 allows a very good wear evenness to be obtained when the tyre is used for sport purposes (for example, on a track).

Preferably, the second grooves 121 do not have a constant width along their extension, having instead a variable width.

In detail, the first segment 124 has a width increasing from its free end towards the intersection area 132 with the second segment 125.

In detail, the first segment 124 may have a width greater than or equal to about 3 mm at its free end.

In a similar way, the second segment 125 has width increasing from its free end towards the intersection area 132 with the first segment 124.

In detail, the second segment 125 may have a width greater than or equal to about 4 mm at its free end.

In the embodiment shown in FIG. 2 the second grooves 121 may have a depth which decreases diminishing from the equatorial plane X-X towards the shoulders. Preferably, the second grooves 121 have a depth less than or equal to 6 mm, more preferably less than 5 mm.

Each shoulder portion B further has a plurality of third grooves 126 extending substantially transversally on the tread band 8.

The third grooves 126 are preferably shorter than the second grooves 121.

In detail, the third grooves have a first segment 127 and a second segment 128. The first segment 127 has an axially inner position with respect to the second segment 128.

The third grooves 126 are circumferentially arranged at the free end of the second segment 123 of the first grooves 120 and have an average inclination between 90° and 140°.

In each shoulder portion B, the third grooves 126 alternate with the second grooves 121.

In detail, each third groove 126 is followed in the circumferential direction by a second groove 121 so as to keep a substantially constant distance between second groove 121 and third groove 126 in the region corresponding to greater camber angles.

In the Applicant's view, such a choice translates into a driving evenness of the tyre while leaning in a bend. In this condition, no sensation of instability is transmitted to the driver of the motor vehicle.

The first segment 127 of the third grooves 126 may be inclined by an angle $\alpha_5$ with respect to equatorial plane X-X of more than 130°, for example equal to about 140°. The second segment 128 of the third grooves 126 is inclined by an angle $\alpha_6$ smaller than $\alpha_5$.

In detail, the second segment 128 of the third grooves 126 may be inclined by an angle $\alpha_6$ with respect to the equatorial plane X-X of more than 120°, for example equal to about 130°.

Preferably, the third grooves 126 do not have a constant width along their extension, having instead a variable width.

In detail, the first segment 127 has a width increasing from its free end towards the intersection area 133 with the second segment 128.

In detail, the first segment 127 may have a width greater than or equal to about 3 mm at its free end.

In a similar way, the second segment 128 has width increasing from its free end towards the intersection area 133 with the first segment 127.

In detail, the second segment 128 may have a width greater than or equal to about 4 mm at its free end.

The third grooves 126 may have a depth which decreases diminishing from the equatorial plane X-X towards the shoulders. Preferably, the third grooves 126 may have a depth less than or equal to 6 mm, more preferably less than 5 mm.

In the preferred embodiment shown in FIG. 2, in axially outermost portions, having a width indicated by "s", of the tread band (close to point "E" of FIG. 1) the pattern has no grooves, i.e. it defines a void to rubber ratio equal to zero.

This choice allows both a considerable increase in the area of the contact region between tyre and ground when running on a bend at the maximum camber angle on dry grounds, and the formation of a closed ring in the tread band which increases the stiffness of the same, above all with respect to shear stresses (i.e. in the plane of the lateral and longitudinal contact forces). The lack of grooves in a small region in an axially outer position of the tread band does not compromise the run on wet grounds, since on wet grounds one does not reach high lean angles when running on a bend. The width "s", measured on the lateral development of the tread band, of the axially outermost portions having a zero void to rubber ratio may range from zero to a maximum of about 35 mm. Preferably, a width of at least 5 mm is left free from grooves in the tread band of a tyre adapted to be mounted on the rear wheel of a motor vehicle, particularly for the Supersport segment.

Figure 3:
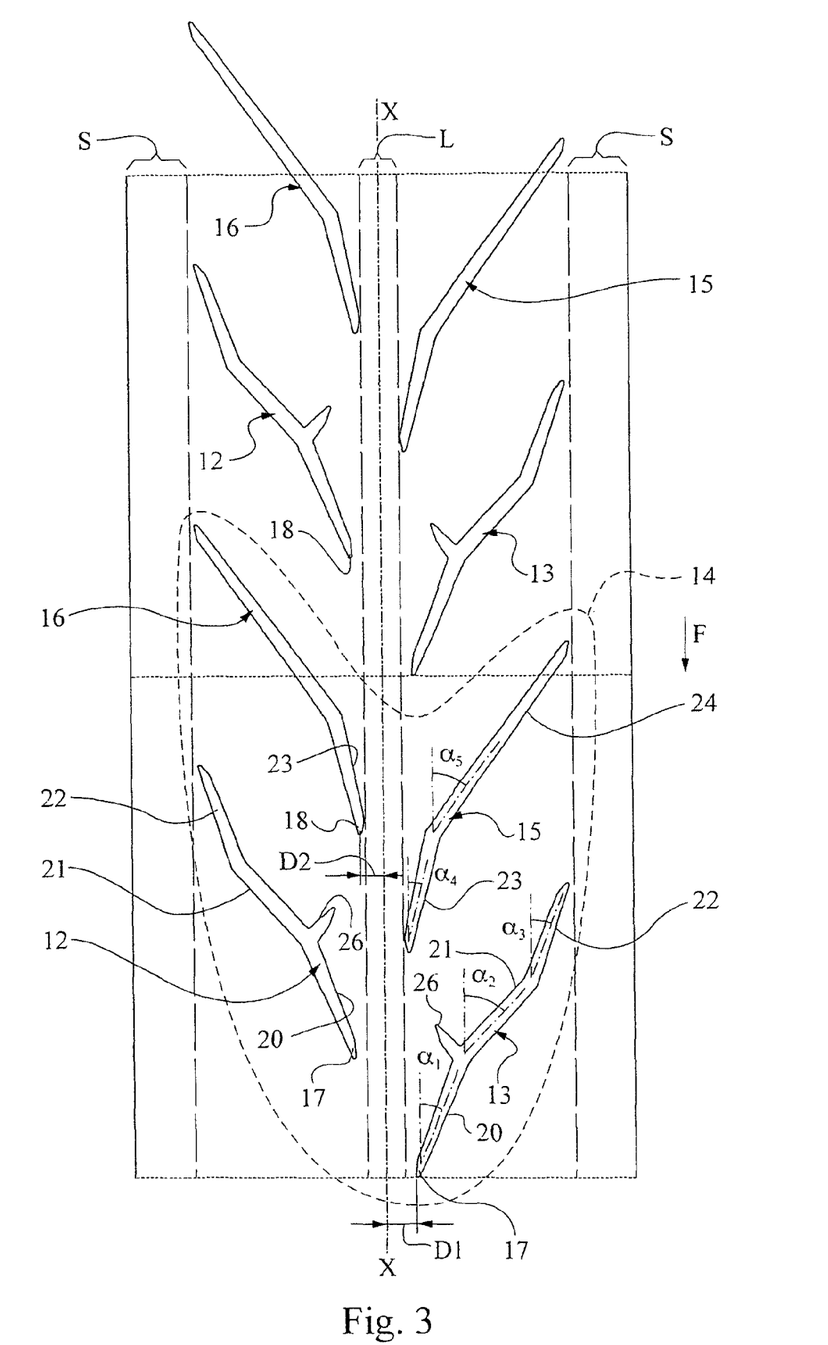
FIG. 3 shows a portion of the circumferential development of a first example of a tread pattern to be applied to a tyre according to the invention, particularly a tyre to be mounted on the rear wheel of a motor vehicle.

FIG. 3 shows an example of a tread pattern which can be used in the rear tyre. A tread pattern such as that shown in FIG. 3 defines on the tread band 8 an overall void to rubber ratio less than 10%. For avoiding an excessive reduction in the number of grooves of the tread pattern, with a resulting safety reduction when running on wet grounds, the tread pattern conveniently defines on the tread band a void to rubber ratio greater than 4%. In the example shown in FIG. 3, the void to rubber ratio is equal to about 9.5%.

The tread pattern comprises a module 14 repeatedly reproduced along a direction of circumferential development of the tyre.

The module 14 has at least one first pair of first grooves 12, 13 inclined in opposite directions with respect to the equatorial plane X-X of the tyre. The first grooves 12, 13 respectively extend on opposite sides of the equatorial plane X-X. The module 14 also comprises at least one second pair of second grooves 15, 16, which are as well inclined in opposite directions with respect to the equatorial plane X-X. The second grooves 15, 16 respectively extend on opposite sides of the equatorial plane X-X.

Each first groove 12, 13 as well as each second groove 15, 16 extends between the equatorial plane X-X and a shoulder.

The first grooves 12, 13 of the first pair are staggered relative to each other in the circumferential direction. The circumferentially staggered arrangement of the first grooves 12, 13 is in particular a circumferentially staggered arrangement of the axially inner ends of the first grooves 12, 13 themselves.

Similarly, also the second grooves 15, 16 of the second pair are staggered relative to each other in the circumferential direction. The circumferentially staggered arrangement of the second grooves 15, 16 is in particular a circumferentially staggered arrangement of the axially inner ends of the second grooves 15, 16 themselves.

Preferably, each pair of first grooves alternates in the circumferential direction with a pair of second grooves 15, 16.

Preferably, the first 12, 13 and the second 15, 16 grooves are staggered in the circumferential direction in such a way as to maintain a substantially constant distance from each other of less than of the pitch. The axially inner ends of the first grooves 12, 13 and/or of the second grooves 15, 16 can be taken as a reference for measuring such a distance.

Such a choice allows the grooves to be distributed in a homogeneous and substantially uniform way in the circumferential direction of the tread band.

Even more preferably, the first 12, 13 and the second 15, 16 grooves are staggered in the circumferential direction in such a way as to maintain a substantially constant distance from each other of about ¼ of the pitch at the equatorial plane X-X.

The first grooves 12, 13, as the second grooves 15, 16 extend from the equatorial plane X-X towards the shoulders and have an average inclination of less than 60°.

In the preferred embodiment shown in FIG. 3 the first grooves 12, 13 do not extend starting exactly from the equatorial plane X-X, but are separated from the same and do not cross it. In detail, the first grooves 12, 13 have an axially inner end 17 separated by a predetermined distance $D_1$ from the equatorial plane X-X.

Similarly, the second grooves 15, 16 do not extend starting exactly from the equatorial plane X-X, but are separated from the same and do not cross it.

In detail, the second grooves 15, 16 have an axially inner end 18 separated by a predetermined distance D2 from the equatorial plane X-X.

In this way, in the preferred embodiment shown in FIG. 3, the first 12, 13 and the second 15, 16 grooves define an annular central portion L straddling the equatorial plane substantially without grooves or notches.

The annular central sub-portion L has an axial extension equal at least to 5% of the lateral development of the tread band 8, and at most to 10%, for example to 8% of the lateral development of the tread band 8.

The Applicant has observed that such a choice can be particularly advantageous for the rear tyre, since it allows to considerably increase the area of the contact region between tyre and ground when running on a straight path at high speed, so as to effectively transfer to the ground the traction torque while accelerating and/or the braking torque while decelerating. Moreover, the formation of a closed tread band ring in the central sub-portion L advantageously increases the stiffness thereof. Still in the embodiment shown in FIG. 3, the predetermined distance D1 between the equatorial plane X-X and the axially inner end 17 of a first groove 12, 13 is different from the predetermined distance D2 between the equatorial plane X-X and the axially inner end 18 of a second groove 15, 16. Advantageously, the predetermined distance D1 is greater than D2. For example, D2 can be 30% less than D1.

In this way, the axially inner ends of the first and the second grooves are not circumferentially aligned with each other. In the Applicant's view, this choice allows an increase in the draining effectiveness and a reduction in the probability of causing instabilities when running on wet grounds because of the alignment of the water draining points.

Preferably, the first grooves 12, 13 have an average inclination with respect to the equatorial plane X-X of less than 60°, more preferably less than 50°, even more preferably an average inclination of less than 45°.

In detail, the first grooves 12, 13 may have, moving axially away from the equatorial plane X-X, at least three substantially straight segments 20, 21, 22.

The three substantially straight segments 20, 21, 22 may have substantially the same length measured along their extension.

The first, axially innermost, segment 20, may be inclined with respect to the equatorial plane X-X by an angle $\alpha_1$ of more than 0°, less than 45°, more preferably less than 30°, for example equal to about 20°.

Keeping the extension of the first segment 20 the same, the choice of an inclination angle with respect to the equatorial plane which is not high allows the impact frequency of the groove ends on the ground when the tyre is rolling at high speed on a straight path to be reduced, with a resulting improvement as regards the behaviour stability of the tyre and a better wear resistance.

The second substantially straight segment 21 is arranged consecutively to the first straight segment 20 and may be inclined with respect to the equatorial plane X-X by an angle $\alpha_2$ greater than $\alpha_1$.

In detail, $\alpha_2$ is less than 60°, preferably less than 50°, for example equal to about 45°.

The third substantially straight segment 22 is arranged consecutively to the second straight segment 21 and may be inclined with respect to the equatorial plane X-X by an angle $\alpha_3$ less than $\alpha_2$.

Advantageously, considered in pairs, the subsequent straight segments of the first grooves 12, 13 moving axially away from the equatorial plane X-X have a difference of inclination from each other at most equal to 25°.

In other words, $\alpha_2$ differs from $\alpha_1$, at most by 25°, as well as $\alpha_3$ differs from $\alpha_2$, at most by 25°.

Such a choice allows avoiding the creation of main grooves, i.e. grooves characterised by a significant extension, which have critical points affected by wear phenomena where the inclination changes. A significant extension of the grooves may correspond, for example, to at least 70% of the circumferential development of the tread band.

As shown in FIG. 3, the first grooves 12, 13 may have a substantially straight fourth segment 26 which is shorter than the remaining segments 20, 21, 22 and has an inclination with respect to equatorial plane X-X opposite to that of the segments 20, 21, 22.

The fourth segment 26 extends from a first groove 12, 13 at the intersection area between the first 20 and second 21 substantially straight segments.

The first grooves 12, 13 do not extend on the whole lateral development of the tread band 8, rather they extend on a width of the tread band equal to 60-70% of the lateral development of the tread band 8.

The first grooves 12, 13 may have a depth which decreases diminishing from the equatorial plane X-X towards the shoulders. Preferably, the first grooves 12, 13 have a depth less than or equal to 6 mm.

According to the embodiment shown in FIG. 3, the first grooves 12, 13 do not have a constant width along their extension. Preferably, the grooves 12, 13 have a width less than or equal to 6 mm.

As mentioned above, each pair of first grooves alternates in the circumferential direction with a pair of second grooves 15, 16.

In the preferred embodiment, shown in FIG. 3, each first groove 12, 13 is followed in the circumferential direction by a first 12, 13 or a second 15, 16 groove having an inclination with respect to the equatorial plane X-X opposite to that of the preceding groove. Similarly, each second groove 15, 16 is followed in the circumferential direction by a second 15, 16 or a first 12, 13 groove having an inclination with respect to the equatorial plane X-X opposite to that of the preceding groove.

Also the second grooves 15, 16 do not extend on the whole lateral development of the tread band 8, rather they extend on a width of the tread band 8 equal to 60-70% of the lateral development of the tread band 8.

Preferably, also the second grooves 15, 16 have an average inclination with respect to the equatorial plane X-X of less than 60°, preferably less than 40°, for example an average inclination of 35°.

In detail, the second grooves 15, 16 may have, moving axially away from the equatorial plane X-X, at least two substantially straight segments 23, 24.

The first, axially innermost, segment 23, may be inclined with respect to the equatorial plane X-X by an angle $\alpha_4$ of more than 0°, less than 30°, preferably less than 20°, for example equal to about 10°.

Also in this case, keeping the extension of the first segment 23 of the second grooves the same, the choice of an inclination angle with respect to the equatorial plane which is not high allows the impact frequency of the groove ends on the ground when the tyre is rolling at high speed on a straight path to be reduced, with a resulting improvement as regards the behaviour stability of the tyre and a better wear resistance.

Preferably, the second substantially straight segment 24 is arranged consecutively to the first straight segment 23 and may be inclined with respect to the equatorial plane X-X by an angle $\alpha_5$ which is greater than $\alpha_4$.

In detail, $\alpha_5$ is less than 60°, preferably less 45°, for example equal to about 35°.

Advantageously, $\alpha_5$ differs from $\alpha_4$ at most by about 25°.

Such a choice allows avoiding the creation of main grooves, i.e. grooves characterised by a significant extension, which have critical points affected by wear phenomena where the inclination changes.

The first segment 20 of a first groove 12, 13 has a higher inclination compared to the first segment 23 of the second groove 15, 16 arranged subsequently in the circumferential direction and in the same axial portion of the tread band 8 with respect to the equatorial plane X-X.

In the Applicant's view, such a choice, in combination with a phase difference of less than 4 between first 12, 13 and second 15, 16 grooves, on the one hand provides the first 12, 13 and the second 15, 16 grooves of the tread band with a good draining, and, on the other hand, limits the risk of formation of structural weakening regions at the central portion of the tread band 8.

In detail, the first segment 20 of the first grooves 12, 13 has an inclination $\alpha_1$ with respect to the equatorial plane X-X greater than the inclination $\alpha_4$ of the first segment 23 of the second grooves 15, 16.

Preferably, the difference between $\alpha_4$ and $\alpha_1$ may be kept below about 15°.

In the embodiment shown in FIG. 3, the axially outer end portion of a first groove 12, 13 has an inclination smaller than the inclination of the axially outer end portion of the second groove 15, 16 arranged subsequently in the circumferential direction and in the same axial portion of the tread band 8 with respect to the equatorial plane X-X.

In the Applicant's view, such a choice, in combination with a phase difference of less than 4 of the pitch between the first 12, 13 and the second grooves 15, 16 allows keeping substantially constant the distances in the circumferential direction between first 12, 13 and second grooves 15, 16 substantially at the shoulder of the tyre 100, with a resulting increase in the driving evenness in the circumferential direction when running on a bend, above all on wet grounds.

In fact, the substantially constant distance in the circumferential direction at the shoulder of the tyre 100 between the first and second grooves allows avoiding the transmission of a sensation of instability to the driver of the motor vehicle when he is leaning while running on a bend.

The two substantially straight segments 23, 24 of a second groove 15, 16 may have a different length measured along their extension.

In detail in the preferred embodiment shown in FIG. 3, the first segment 23 is shorter than the second segment 24.

Preferably, the first segment 23 is less than 50% of the length of the second segment 24.

The second grooves 15, 16 may have a depth which decreases diminishing from the equatorial plane X-X towards the shoulders. Preferably, the second grooves 15, 16 have a depth less than or equal to 6 mm.

According to the embodiment shown in FIG. 3, the second grooves 15, 16 do not have a constant width along their extension. Preferably, the grooves 15, 16 have a width less than or equal to 6 mm.

In the example shown in FIG. 3, in axially outermost portions, having a width indicated by "s", of the tread band (close to point "E" of FIG. 1) the tread pattern has no grooves, i.e. it defines a void to rubber ratio equal to zero.

This choice may be particularly advantageous for the rear tyre, since it allows both a considerable increase in the area of the contact region between tyre and ground when running on a bend at the maximum camber angle on dry grounds, and the formation of a closed ring in the tread band which increases the stiffness of the same, above all with respect to shear stresses (i.e. in the plane of the lateral and longitudinal contact forces).

The increase in the area of the contact region with the ground and the increase in the stiffness with respect to shear stresses can significantly improve the roadholding of the rear wheel of the motor vehicle when running on a bend and/or the effective transfer of the traction torque to the ground when accelerating on leaving a bend. The width "s", measured on the lateral development of the tread band, of the axially outermost portions having a zero void to rubber ratio may range from zero to a maximum of about 35 mm. Preferably, a width of at least 5 mm is left free from grooves in the tread band of tyre adapted to be mounted on the rear wheel of a motor vehicle, particularly for the Supersport segment.

In the following, in table 1, the drive results obtained comparing three tyre sets mounted on the wheels of a motor vehicle (Suzuki GSX 1000) are reported.

In particular, the third set shows the results obtained with a pair of tyres according to the invention, wherein the front one has a size 120/70 ZR17 and the rear one has a size 190/55 ZR17. The first and second sets show the results obtained with a comparison pair of tyres manufactured by the same Applicant, respectively according to the model "Diablo Rosso" and to the model "Diablo Supercorsa" with the same structure and size.

Furthermore, the tyres of the pair according to the invention have a void to rubber ratio similar to that of the tyres of the second set, and a void to ratio lower than that of the tyres of the first set.

In table 1 the assessments obtained from the pair of tyres according to the invention as compared with the comparison pair of tyres are reported for five parameters: maneuverability on wet grounds, front tyre draining, rear tyre draining, behaviour predictability and controllability.

TABLE 1

|  | Camber angle | 1st Set (comparison 1) | 2nd Set (comparison 2) | 3rd Set (invention) |
|---|---|---|---|---|
| Manoeuvrability on wet grounds |  | 3.80 | 4.00 | 3.80 |

TABLE 1-continued

| | Camber angle | 1st Set (comparison 1) | 2nd Set (comparison 2) | 3rd Set (invention) |
|---|---|---|---|---|
| Front tyre draining | 0° | 4.00 | 3.50 | 4.00 |
| | 0° > 10° | 4.00 | 3.00 | 4.00 |
| Rear tyre draining | 0° | 4.00 | 3.50 | 4.00 |
| | 0° > 10° | 3.80 | 3.00 | 4.00 |
| Behaviour predictability | | 4.00 | 3.50 | 4.00 |
| Controllability | | 4.00 | 3.50 | 4.00 |

The pair of tyres according to the invention has a better overall behaviour than that of the pair of the second comparison set in particular as regards the front and rear tyre draining capacity, and a behaviour at least comparable to that of the pair of the first set as regards all of the parameters.

The pair of tyres according to the present invention has therefore, on the one hand, a behaviour at least comparable to that of a pair of tyres having a higher void to rubber ration, designed also for running on wet roads and appreciated by motorcyclists due to their very good features of handling, grip, maneuverability and stability also at high speeds, and, on the other hand, a better behaviour, in particular when running on wet grounds, than that of a pair of tyres with similar void to rubber ratio and designed for the same segment of use, and equally appreciated by motorcyclist keen on a sport, use of the motor vehicle.

The present invention has been described with reference to some embodiments thereof. Many modifications can be made in the embodiments described in detail, still remaining within the scope of protection of the invention, defined by the following claims.

The invention claimed is:

1. A pair of motorcycle tyres, comprising a front tyre and a rear tyre capable of being mounted respectively on a front wheel and a rear wheel of a two-wheeled vehicle, each tyre of the pair having a tread band extending around an axis of rotation and having a tread pattern such as to define overall a void to rubber ratio less than 10%, and locally, in an annular central sub-portion straddling a respective equatorial plane of each tyre of the pair, a void to rubber ratio substantially equal to zero, wherein:
the tread pattern of the tread band of the front tyre comprises a central annular portion straddling an equatorial plane and two annular shoulder portions disposed on axially opposite sides of the central annular portion;
the central annular portion has an axial dimension less than 50% of lateral development of the tread band, and comprises at least a pair of first grooves extending substantially longitudinally on opposite sides of the equatorial plane in such a way as to form a concavity directed toward the equatorial plane;
each shoulder portion has an axial dimension that is less than 35% of the lateral development of the tread band and comprises a plurality of second grooves isolated from the first grooves and extending substantially transversally so as to form an average inclination with the equatorial plane greater than 90°, each second groove consisting of a substantially linear first segment and a substantially linear second segment located axially outwardly of the first segment, wherein the second segment is inclined at a greater angle with respect to the equatorial plane than the first segment;
the shoulder portion has a plurality of substantially transverse third grooves alternating in a circumferential direction with the second grooves and extending substantially transversally so as to form an average inclination with the equatorial plane greater than 90°, each third groove consisting of a substantially linear first segment and a substantially linear second segment located axially outwardly of the first segment, wherein the second segment is inclined at a smaller angle with respect to the equatorial plane than the first segment; and
the tread pattern of the tread band of the rear tyre comprises a module which is replicated along a direction of circumferential development of the tyre, said module comprising:
at least one first pair of first grooves inclined in opposite directions with respect to the equatorial plane of the tyre; each first groove of the first pair extending along a portion of tread band between the equatorial plane and a respective shoulder comprising an axial extension of at least 30% of the tread band lateral development, and forming an average inclination less than 60° with the equatorial plane; and
at least one second pair of second grooves inclined in opposite directions with respect to the equatorial plane of the tyre,
wherein each of the first grooves is spaced from the equatorial plane by a first distance and each of the second grooves is spaced from the equatorial plane by a second distance, the first distance being different than the second distance.

2. The pair of motorcycle tyres according to claim 1, wherein the tread pattern of the front and rear tyres defines an overall void to rubber ratio on each tread more than 4%.

3. The pair of motorcycle tyres according to claim 1, wherein the tread pattern of the front and rear tyres defines at least one axially outer portion on each tread band in which the void to rubber ratio is substantially zero.

4. The pair of motorcycle tyres according to claim 1, wherein, in the rear tyre, the first grooves of each first pair are mutually staggered in a circumferential direction in such a way as to maintain a substantially constant distance of less than ½ of pitch.

5. The pair of motorcycle tyres according to claim 1, wherein each second groove of the second pair of second grooves of the rear tyre extends between the equatorial plane and a respective shoulder through an axial extension equal to at least 30% of the lateral development of the tread band.

6. The pair of motorcycle tyres according to claim 5, wherein said second grooves are inclined at an average angle less than 60° to the equatorial plane.

7. The pair of motorcycle tyres according to claim 5, wherein, in the rear tyre, the second grooves of each second pair are mutually staggered in the circumferential direction in such a way as to maintain an approximately constant distance of less than ½ of the pitch.

8. The pair of motorcycle tyres according to claim 5, wherein, in the rear tyre, the first grooves have an axially inner end which is at a predetermined distance $D_1$ from the equatorial plane and the second grooves have an axially inner end which is at a predetermined distance $D_2$ from the equatorial plane.

9. The pair of motorcycle tyres according to claim 1, wherein, in the rear tyre, the first grooves comprise, moving axially away from the equatorial plane of the tyre, respectively, at least a first, a second and a third segment, all segments being substantially straight, the first segment being inclined at an angle $\alpha_1$ with respect to the equatorial plane, the second segment being inclined with respect to the equatorial plane at an angle $\alpha_2$ greater than $\alpha_1$, and the third segment being inclined with respect to the equatorial plane of an angle $\alpha_3$ less than $\alpha_2$.

10. The pair of motorcycle tyres according to claim 5, wherein, in the rear tyre, the second grooves comprise, moving axially away from the equatorial plane of the tyre, two substantially straight segments in which a first segment has an extension that is less than a second segment.

11. The pair of motorcycle tyres according to claim 10, wherein in the rear tyre, said first segment of the second grooves is inclined with respect to the equatorial plane at an angle $\alpha_4$ and said second segment of the second grooves is inclined with respect to the equatorial plane at an angle $\alpha_5$ greater than $\alpha_4$.

12. The pair of motorcycle tyres according to claim 1, wherein, in the front tyre, the first grooves of each pair comprise at least one first segment and at least one second segment, the second segment being inclined with respect to the first segment.

13. The pair of motorcycle tyres according to claim 12, wherein, in the front tyre, the first segment of the first grooves has an extension that is less than the second segment and precedes the second segment in a tyre rolling direction.

14. The pair of motorcycle tyres according to claim 1, wherein, in the front tyre the first grooves have a circumferential extension that is less than 6% of the overall circumferential development of the tyre.

15. The pair of motorcycle tyres according to claim 12, wherein, in the front tyre, the first segment of the first grooves has an inclination of less than 45° to the equatorial plane and the second segment of the first grooves has an inclination of more than 90° to the equatorial plane.

16. The pair of motorcycle tyres according to claim 1, wherein, in the front tyre, the first grooves of each pair are mutually staggered in a circumferential direction.

* * * * *